(12) United States Patent  
Sherlock

(10) Patent No.: US 9,710,015 B2  
(45) Date of Patent: Jul. 18, 2017

(54) WEARABLE COMPUTER SYSTEM

(71) Applicant: Thomas Mallory Sherlock, Los Altos, CA (US)

(72) Inventor: Thomas Mallory Sherlock, Los Altos, CA (US)

(73) Assignee: Solatido, Inc., Los Altos, CA (US)

( * ) Notice: Subject to any disclaimer, the term of this patent is extended or adjusted under 35 U.S.C. 154(b) by 9 days.

(21) Appl. No.: 14/551,683

(22) Filed: Nov. 24, 2014

(65) Prior Publication Data

US 2015/0077913 A1     Mar. 19, 2015

Related U.S. Application Data

(63) Continuation of application No. 13/295,998, filed on Nov. 14, 2011, now Pat. No. 8,896,992.

(60) Provisional application No. 61/414,749, filed on Nov. 17, 2010.

(51) Int. Cl.  
*G06F 1/16* (2006.01)

(52) U.S. Cl.  
CPC ............ *G06F 1/163* (2013.01); *G06F 1/1662* (2013.01); *G06F 1/1664* (2013.01); *G06F 1/1666* (2013.01); *G06F 1/1671* (2013.01)

(58) Field of Classification Search  
None  
See application file for complete search history.

(56) References Cited

U.S. PATENT DOCUMENTS

| | | | |
|---|---|---|---|
| 5,267,127 A * | 11/1993 | Pollitt | B41J 5/105 341/20 |
| 5,278,779 A | 1/1994 | Conway et al. | |
| 5,318,367 A * | 6/1994 | Braun | B41J 5/105 341/20 |
| 5,410,333 A | 4/1995 | Conway | |
| 5,491,651 A * | 2/1996 | Janik | G06F 1/163 361/679.03 |
| 5,775,822 A * | 7/1998 | Cheng | G06F 3/0219 400/486 |

(Continued)

FOREIGN PATENT DOCUMENTS

| | | |
|---|---|---|
| EP | 2251769 A2 | 11/2010 |
| WO | 2010090521 A1 | 8/2010 |

*Primary Examiner* — Courtney Smith  
*Assistant Examiner* — Zhengfu Feng  
(74) *Attorney, Agent, or Firm* — Law Office of Christopher Peil; Christopher Peil

(57) ABSTRACT

A wearable computer system that provides for convenient and efficient use of all fingers while the user is standing, reclining or using hands intermittently for other tasks. The central unit hangs from a neck strap and communicates with a head mounted display. The central unit's front surface has keys, accessible from opposite edges by each hand. Typing is similar to the traditional, but rotated 90 degrees on each side. Keys are individually assignable to any letter, symbol, musical note, color, action, or macro. Back panels have thumb keys and controls, and can be modified to accept alternate thumb controls and additional hardware, such as sensors, circuits, cameras, and auxiliary connectors for specific tasks such as musical instrument performance or augmented reality game play. Smartphones, can be incorporated within or connected to the central unit. Desktop use can be accomplished by unfolding the panels of one embodiment.

22 Claims, 13 Drawing Sheets

(56) References Cited

U.S. PATENT DOCUMENTS

| | | |
|---|---|---|
| 6,107,988 A | 8/2000 | Phillipps |
| 6,132,118 A | 10/2000 | Grezeszak |
| 6,297,752 B1 | 10/2001 | Ni |
| 6,822,854 B2 | 11/2004 | Te Maarssen et al. |
| 6,885,314 B2 | 4/2005 | Levin et al. |
| 6,909,424 B2 | 6/2005 | Liebenow et al. |
| 6,939,066 B2 | 9/2005 | Goodenough |
| 7,088,339 B2 * | 8/2006 | Gresham ............... G06F 3/0216 345/168 |
| 7,265,970 B2 * | 9/2007 | Jordan .................... G09F 21/02 361/679.27 |
| 2005/0002158 A1 * | 1/2005 | Olodort ................. G06F 1/1616 361/679.15 |
| 2005/0083248 A1 * | 4/2005 | Biocca ............... A41D 31/0088 345/8 |
| 2007/0036603 A1 | 2/2007 | Swoboda |
| 2008/0043416 A1 * | 2/2008 | Narayan ................. G06F 1/163 361/679.03 |
| 2008/0173529 A1 * | 7/2008 | Hsu ....................... G06F 3/0221 200/5 A |
| 2010/0045928 A1 * | 2/2010 | Levy ....................... H04M 1/05 351/158 |

\* cited by examiner

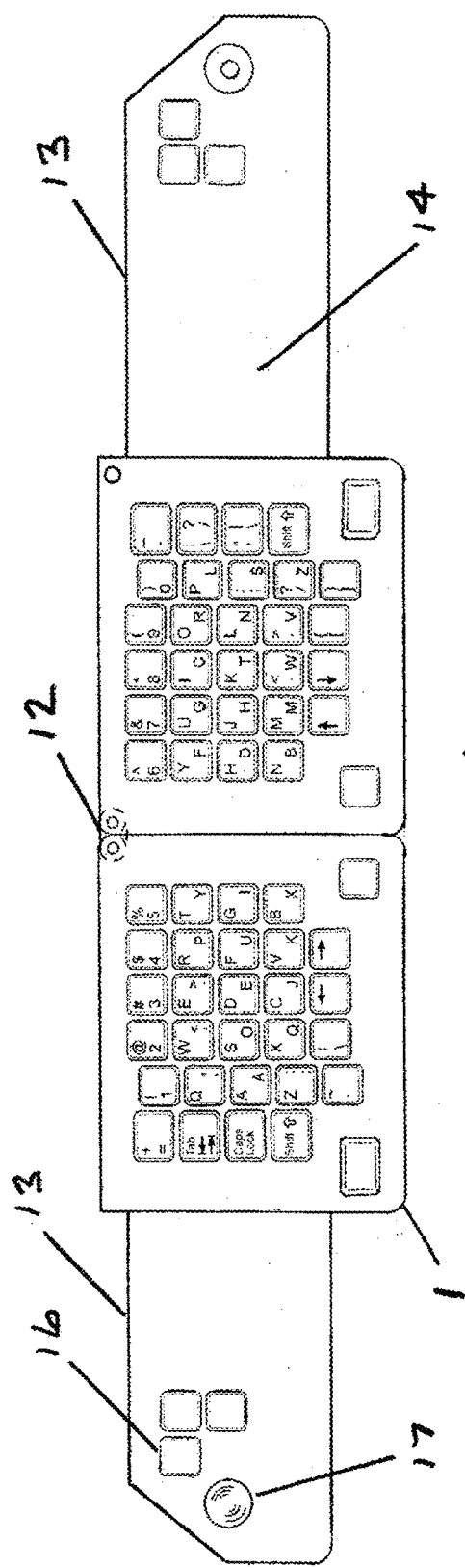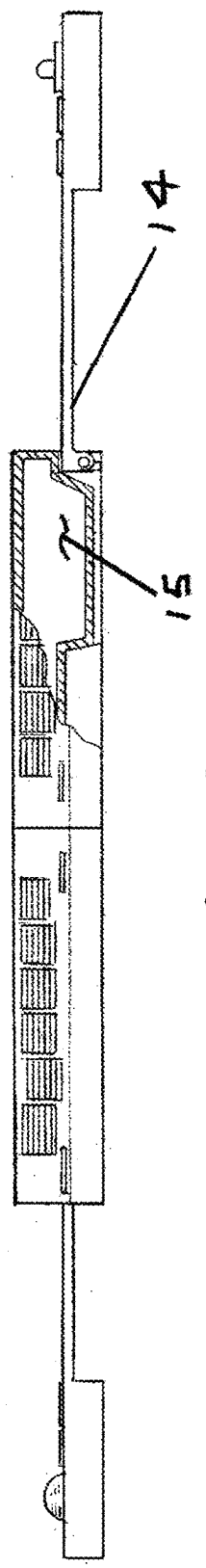
Fig. 4
Fig. 5

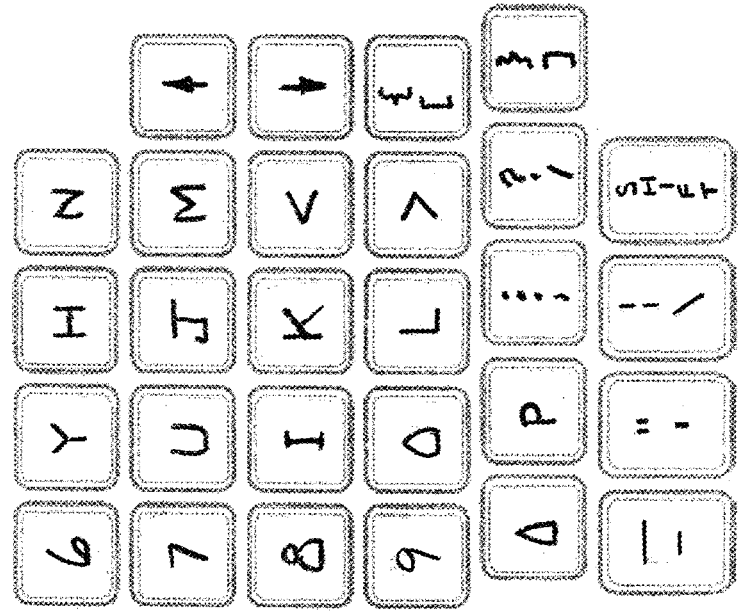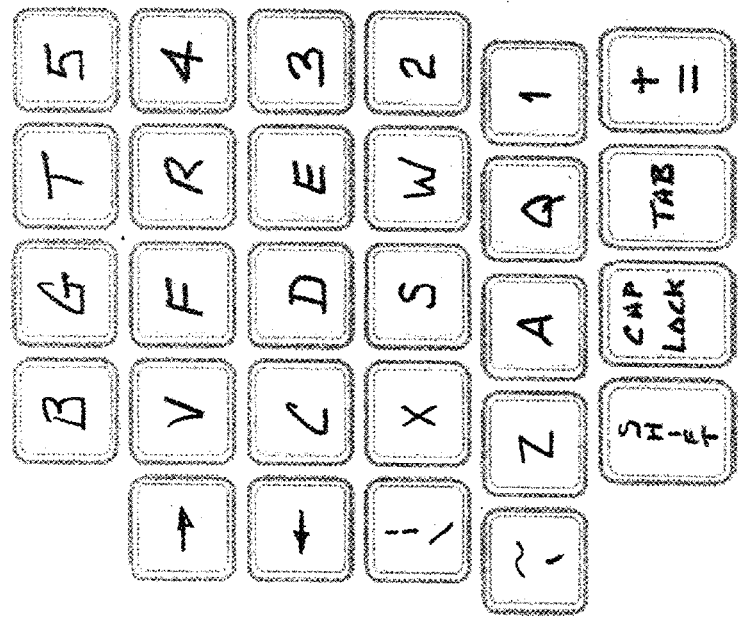
Fig. 9

WEARABLE COMPUTER SYSTEM

CROSS REFERENCE TO RELATED APPLICATIONS

This application is a continuation of U.S. patent application Ser. No. 13/295,998, filed Nov. 14, 2011, issuing Nov. 25, 2014 as U.S. Pat. No. 8,896,992.

U.S. patent application Ser. No. 13/295,998 claims benefit of U.S. provisional patent application Ser. No. 61/414,749, filed Nov. 17, 2010.

U.S. patent application Ser. No. 13/295,998 and U.S. provisional patent application Ser. No. 61/414,749 are both incorporated this application in their entireties as if fully set forth herein.

BACKGROUND

Field of the Invention

The need to balance size, weight and portability against efficient control of mobile devices has brought about various compromises pitting portability against capability relating to the physical human factors of these devices. Handheld devices, such as smartphones, offer various input methods, including speech recognition, touch-screens and miniature keyboards. These methods are sometimes further facilitated by predictive text programs and pattern recognition. The size limitation created by the desire to make mobile devices as portable as possible, usually fitting conveniently in the user's pocket, has placed a significant limitation on the ease with which a user can physically enter and manipulate data. Although the computing power of a laptop computer is now available in a much smaller package, the larger, tactile keyboard of the laptop configuration is not. This is partially due to the fact that the conveniently small size of the mobile device does not allow for the additional size and bulk of a full sized keyboard. It is also partially due to the fact that a mobile device, by definition, must be used in many instances that do not allow for the convenient deployment of a keyboard that relies on the use of a horizontal surface. Some larger portable and/or folding keyboards are available for use with tablet and smartphone devices, but still require the availability of a stationary, horizontal surface. Users who need to enter or manipulate a significant amount of data often opt to defer this type of work until they are in a position to use a computer with a fully capable, tactile keyboard that allows for the rapid entry of data using touch-typing methods. Some mobile devices provide miniature QWERTY keyboards to avoid the need to use multiple strokes on a numeric keypad key to achieve alternate characters. While this increases the usability of the device to a certain extent, and seems to use the same QWERTY key pattern as the user's desktop keyboard, it requires a different muscle memory pattern since all fingers are used on a desktop keyboard and only thumbs are used on the miniature QWERTY keyboard of the mobile device. Chording keypad layouts such as the FrogPad™ offer compact size for those willing to learn character input that requires multiple, simultaneous key activation for each character. Tablet style computers offer an attractive compromise for some, since they provide a larger display area and can be used without a full featured, tactile keyboard, as long as the user is willing to limit input to the capabilities of the touch-screen and its non-tactile keyboard. Tablet computers with keyboards, such as the Dell Inspiron Duo offer tablet capabilities on a touch screen as well as a keyboard when opened into that position however, touch typing cannot be accomplished without placing the device on a lap, table or other supporting surface. Some touch-screen devices have provided a quasi-tactile feel by giving an audible or vibratory prompt when a displayed key is activated. This helps to a certain extent, to let the user know that a key has been activated, but a touch-screen cannot help the tactile location of the user's fingers for efficient touch typing. If the user looks away from the key figures to refer to the text or another document, touch typing cannot be continued since each key of a touch-screen keyboard must be located by eye before it is pressed. An attempt to remedy this resulted in a plastic overlay for the tablet screen that contains holes that can be felt in relief to help locate the correct key positions.

As mobile applications become more capable and numerous, the ability to enter and manipulate data will need to keep pace in a way that is unlikely to be met by input devices that are less than full featured, tactile keyboards. Although content is easily delivered to the user by existing mobile devices, user created content is difficult to enter into these devices if that content is more than a brief note. This capability will be particularly needed by many professionals such as Attorneys, Authors, Managers, Software engineers, Police Officers, Social Workers, Graphic Designers, Students or anyone who must create or edit extensive content including those involved in co-operative 'Social Production' enterprises, otherwise known by the term 'Commons-based peer production' as coined by Harvard Law School professor Yochai Benkler. Mobile applications for the medical treatment of rural populations are now becoming more widely available to health practitioners with smartphones. This is already saving lives and will continue to grow in popularity because of its cost advantages and ability to penetrate geographical barriers. While these applications offer significant advantages, they will increasingly require the entry of a great deal of data concerning patients' names, location, symptoms, history, relatives and contacts. A method will be needed whereby significant data can be entered in a ergonomically reasonable manner while allowing for conditions that do not always provide for seated positions or horizontal surfaces. Patient confidentiality concerns may also dictate that the display of information be hidden, especially in areas of great crowding. Micro-displays, such as view finders or Head Mounted Displays, may be most appropriate for applications requiring confidentiality of medical information as well as applications used by other professionals while in public places such as commuting on public transportation, attending hearings or waiting in line.

Special purpose devices have been developed for the military, delivery drivers and agricultural workers in order to facilitate the use of portable computers and wearable computers, but most of these are application specific and rarely find application broadly. Furthermore, many proposed wearable computer designs require the user to wear more hardware and attachment paraphernalia than might be practical for most daily tasks or commonly acceptable comfort and fashion.

GPS and Head Mounted Displays are making it possible to play games in a dedicated Virtual Reality space or even to bring the game into the real world through Augmented Reality. In these cases the user sees an overlay of the game content superimposed over the real world scene that is visible while the user is out and about in public. Various 2D or 3D gaming software can be viewed by the user while wearing a device such as the Vuzix Wrap 920 AR, or Vuzix STAR 1200. This same technology is proposed by advertisers, to offer advertising content to potential shoppers, while wearing an Augmented Reality headset and computer in downtown areas or in shopping malls. Advertising of coupons and specials can now be shown to users, superimposed on the user's view of actual storefronts of the associated retail business, after ascertaining the user's location and orientation via compass sensor, GPS and inertial sensors within the user's smartphone or Head Mounted Display. These technologies are starting to be used to superimpose not only gaming and alphanumeric data, but graphics that suggest the next step to perform during the maintenance of equipment. They may soon be used to do the same during medical procedures. With the addition of more accurate and precise location data, such as optical, radio or magnetic markers, it will become easier to incorporate machine vision into some of these operations so that tutorials or remote experts can assist field technicians in what would otherwise be a difficult or impractical procedure.

BACKGROUND OF THE INVENTION

Although mobile device users can easily obtain vast content, a very significant gap still exists between the data that can be conveniently entered into a stationary computing device by one using a full function keyboard that is positioned on a horizontal surface, and the data that can be conveniently entered into a mobile computing device by one who must use thumbs on a miniature keyboard or a touchscreen. The physical abilities and limitations of the human body must be integrated into any useful system of content creation in mobile devices. A practical, wearable computer should facilitate frequent deployment and considerable use for the creation and manipulation of significant content in a manner that is either familiar or easy to learn, so as to approximate the speed at which the user could accomplish the task if seated at a desktop computer. Furthermore, it should allow for the free use of the user's hands for intermittent related activities without looking ridiculous, intimidating or offensive to others.

Accordingly, it is an object of the present invention, to provide a portable and practical method and apparatus for entering data into a mobile computing device, that has a wearable, programmable, full function keyboard, capable of supporting any touch typing technique with which a user may already be familiar, or any alternate pattern the user chooses or invents, without necessarily requiring the user to place the device on a lap or other horizontal surface.

It is a further object of the present invention to provide a method and apparatus for mobile computing that is ergonomically comfortable and safe for continuous use.

It is a further object of the present invention to provide a method and apparatus for mobile computing that allows the user to have hands free for other tasks when necessary.

It is a further object of the present invention to provide the option of at least one micro-display on or within the central unit, to be used momentarily if the central unit is not at a particular moment connected to hardware such as a smartphone or the system's head mounted display.

It is a further object of the present invention to provide a method and apparatus that allows the user to modify the assignment of the keys to match any preferred layout, language, set of characters, colors, actions, macros or musical notes that the user's task may require, and to allow for the physical modification and interchangeability of the keys and controls on the posterior side of the central unit in order to accommodate the user's preferences and the requirements of specific tasks.

It is a further object of the present invention to provide a method and apparatus that allows the user to wear and use the assembly underneath outer garments so the device can be used while protected from the elements or hidden from view.

It is a further object of the present invention to provide a method and apparatus that allows the user to view key assignment legends in auxiliary views of the head mounted display, thereby facilitating the use of a keyboard that cannot be directly viewed, and alphabets and alternate character sets that may require far more keys than can be made available on one keyboard. Some Asian languages will require several alternative graphical key menus to make available even their most commonly used characters.

It is a further object of the present invention to provide a method and apparatus that allows the user to opt for the desktop use of the keyboard when necessary, or more comfortable, by allowing the housing to open into a configuration similar to that of a conventional keyboard.

It is a further object of the present invention to provide a method and apparatus that allows the user to play the apparatus as a musical instrument by using the keys and other input sensors to control the pitch and tone of the audio output.

It is a further object of the present invention to provide a method and apparatus that allows the user to be graphically instructed in the use of the apparatus, sufficient to develop muscle memory specific to a given task, whether the use is as a word processor, musical instrument or graphics workstation.

It is a further object of the present invention to provide a method and apparatus that allows the user to configure a wearable computing and communication device to any desired application through the reprogramming, replacement, modification or addition of system components.

SUMMARY OF THE INVENTION

According to a broad aspect of the present invention, there is provided a central unit that is worn by the user, on the anterior of the user's torso, suspended from a neck strap, and held and operated using both hands, each hand grasping the central unit from an opposite side of its housing, as one would suspend and grasp a pair of binoculars prior to use. Half of a full function, tactile keyboard is provided on the anterior face of each side of the central unit housing, such that the user may enter text or other data using the same finger as the user would have used for each key on a desktop keyboard. The posterior side of the central unit housing contains controls that are operated by the thumbs for such actions as enter/return, Ctrl, Alt, Shift, scroll, cursor control and the entering of spaces in text, as well as mouse pad, trackball and joystick type controllers for use during game play and graphical editing. Display of information is accomplished by way of a head mounted display that the user wears near to the eye in a manner that allows the user to see the computer's graphical user interface with at least one of the user's eyes at all times. The head mounted display is in communication with the central unit through a cable or wireless connection. Options are provided that allow for the unfolding and deployment of the central unit upon a flat surface if the user so desires. Further options are provided allowing for the addition and incorporation of auxiliary sensors, controls, and equipment to facilitate specific applications and hardware.

BRIEF DESCRIPTION OF THE DRAWINGS

FIG. 4 shows the central unit from above, as deployed for use on a flat surface, such as a table. The central unit has been folded open to allow all keys to be accessed from the same side, as one would use a traditional keyboard. Panels containing thumb controls have been folded outward to allow access to those controls during desktop use. The thumb controls shown are representative of various control options and are not indicative of any particular preferred embodiment.

FIG. 5 is a front view of the central unit, as deployed for use on a flat surface and shows a sectional view of one side of the central unit showing the internal space that may be used to house resident electronics, batteries, various sensors or additional devices.

FIG. 9 shows an example of the display that would be available in any convenient portion or portions of the display window of the user's head mounted display (such as the upper corners) to assist the user in locating any given key while learning to use the system or while switching between different applications, alphabets or character sets. The figure shows the standard QWERTY layout that would appear for a dual concave keyboard but would change to match any layout the user had selected or reprogrammed.

DETAILED DESCRIPTION

Figure 1:
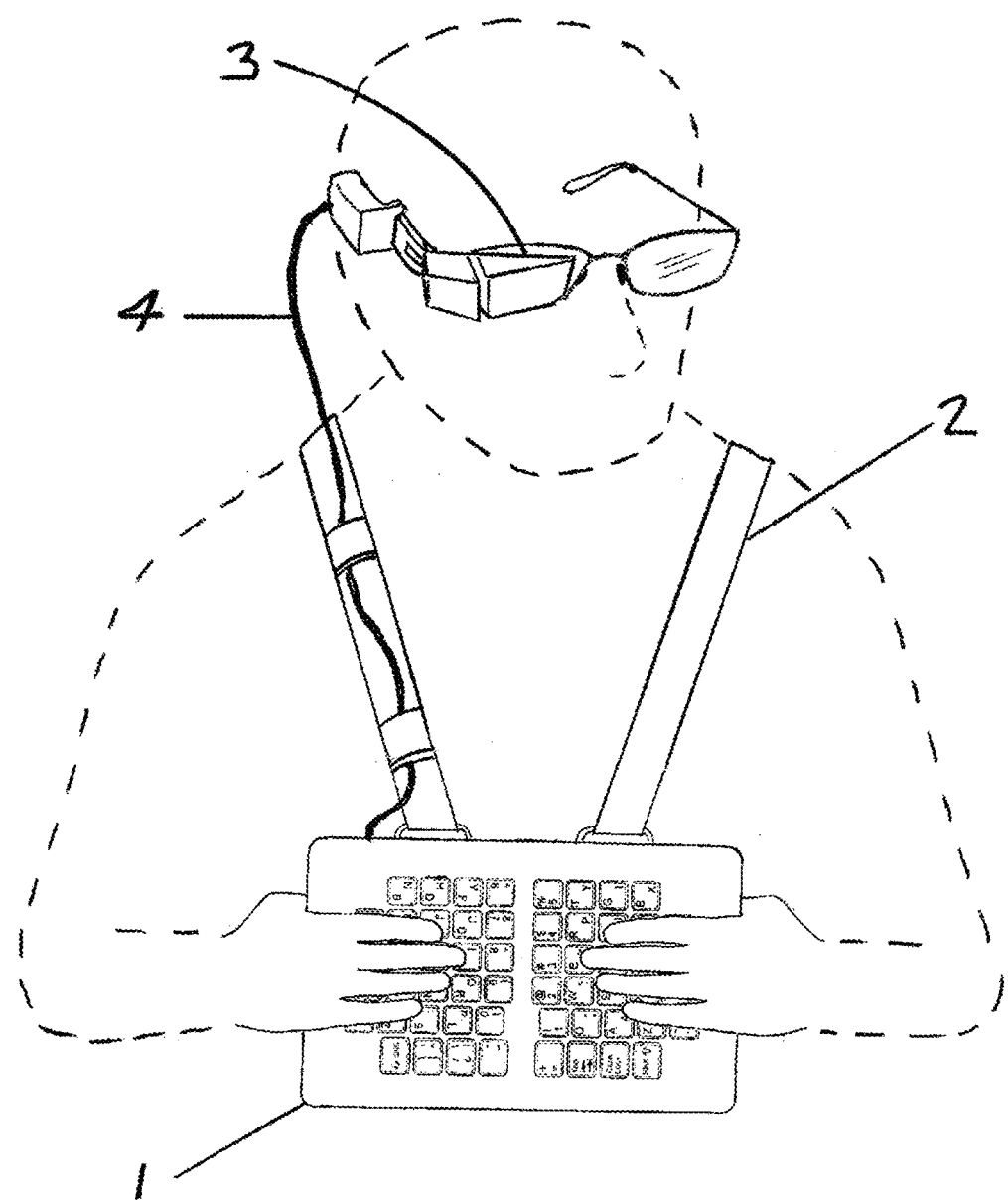
FIG. 1 shows the basic, non-convertible system, comprising a head mounted display and the central unit suspended in front of the user by a neck strap and operated from one side by the user's right hand and from the other side by the user's left hand. The user's thumbs are behind the assembly in this view as they are used to operate various keys, such as shift and space keys, and cursor controls such as joysticks, mouse pads and scroll wheels, and the touchscreen of any other mobile device that may be presently installed.

The device of the present invention is a wearable computing system comprising a head mounted display, connected to, or in communication with, a central unit which incorporates a full size and function, tactile keyboard, made up of electronic key switches, along with other controls and computing and communication electronics. The electronic technology of the hardware used within the head mounted display and central unit is that which is known in the art and familiar to those who are versed in the design of laptop computers, smart phones and displays. The mechanical housing, assemblies and subassemblies are constructed using methods known in the art of laptop and smartphone construction, such as injection molding, metal stamping, pad printing and various connecting and bonding techniques.

While the present invention incorporates a great deal of the known electronic and mechanical technology, its primary focus is on the ergonomics of using a mobile computing and communication device in a manner that enables the user to create, enter and manipulate far more data than can be reasonably and conveniently handled using the presently available mobile devices. The central unit is suspended from the user's neck by a strap, and held in front of the user as one would suspend and hold a pair of binoculars prior to use. A neck strap is the preferred method of suspending the central unit because it allows for easy dawning and removal. For certain applications, a harness, vest, or hook and loop fastener may be more appropriate. The keyboard of the central unit is arranged and oriented such that data entry is accomplished by making keystrokes with the fingers entering their respective key areas from opposite edges of the central unit assembly. The user's right hand holds the rightmost edge of the central unit and the user's left hand holds the leftmost edge, placing fingers on the anterior surface and thumbs on the posterior surface of the central unit. While predetermined keyboard layouts are available and user selectable, such as QWERTY, Dvorak, and any specific language or regional variation of presently used keyboard layouts, the key assignments are individually user definable and the user may toggle between multiple, alternative layouts. This accommodates the needs of users who regularly enter many symbols or use alphabets that have hundreds or thousands of characters. This also accommodates varied applications requiring intensive non-alphanumeric input, such as software coding, complex computer aided design parameters, 3D game control, or musical instrument composition, arrangement and performance. In one preferred embodiment, assemblies of twenty eight keys are available, in a concave arrangement, on each side of the anterior surface, giving a total of fifty six keys that are accessible by the 8 fingers of both hands while wearing the central unit suspended in front of one's torso. Thumb controls and keys are positioned on the posterior surface of the central unit. Additional keys are provided for use in the desktop configuration, for spacing and shift control, but will not normally be used while the unit is worn suspended from the neck. Other configurations provide between twenty four and thirty five keys on each side of the anterior surface in a more planar arrangement.

In the most basic embodiment, referring to FIG. 1, the central unit (1) of the device is suspended in front of the user by a neck strap (2) and held between the hands from opposite edges, as one would hold a pair of binoculars prior to use. A Head Mounted Display (3) is worn by the user and is connected to the central unit (1) through a wired connection such as a VGA, USB, DLNA or HDMI cable (4) or one of the various wireless connections such as WiFi, Bluetooth, or a tethered smartphone.

Figure 2:
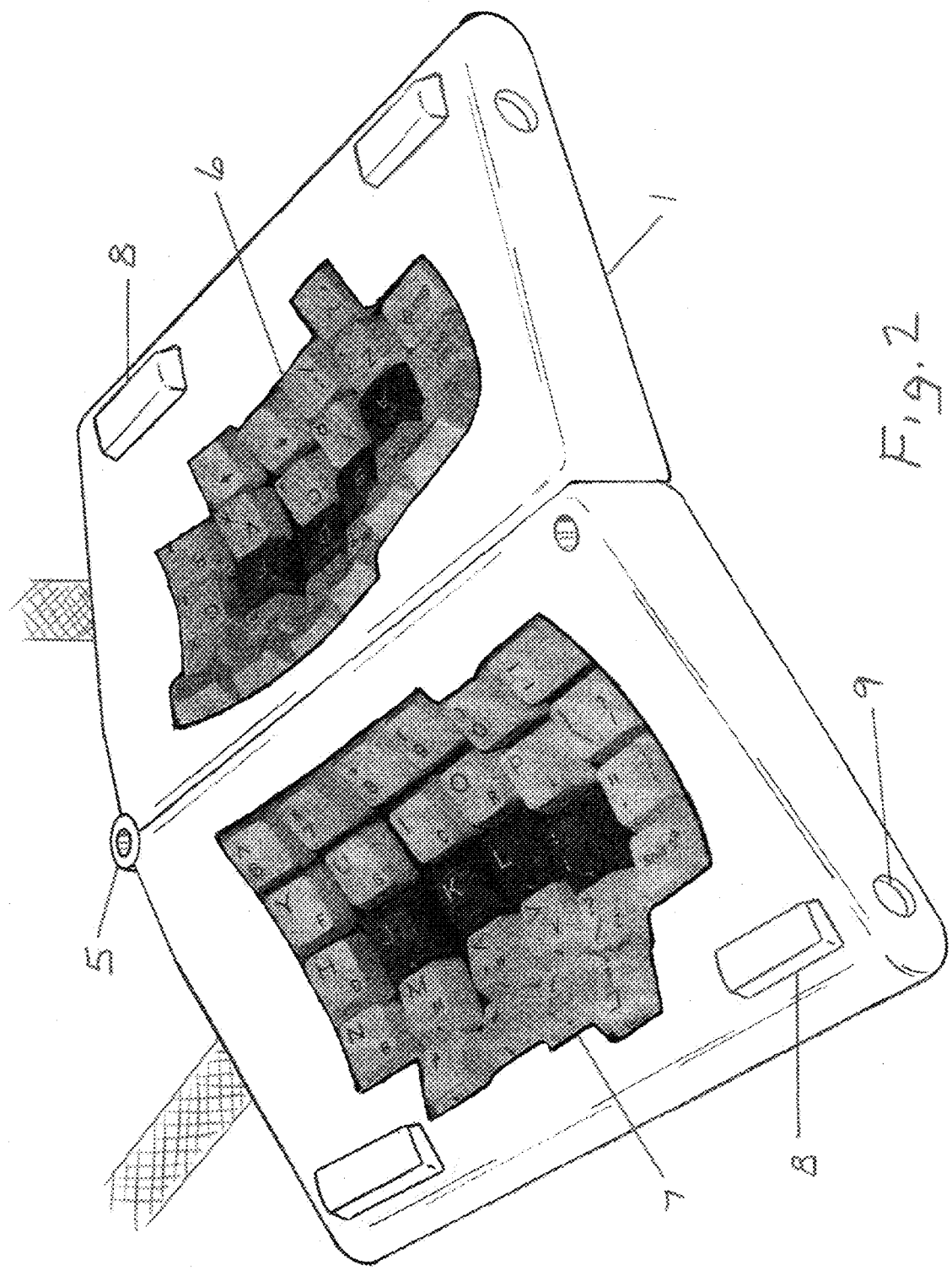
FIG. 2 shows the geometry of the central unit in one preferred embodiment, including dual-concave key banks that allow for the most advantageous access to each key by each respective finger. While the keys are labeled for both QWERTY and Dvorak layouts in this figure, this labeling will not necessarily be referred to during use while the keyboard is suspended in front of the user. A user may choose to be shown key locations in auxiliary display windows within the head mounted display. This figure also shows a hinge at the center-top that allows for the optional rotation of the two halves of the assembly for use on a desktop if the user so desires.

Referring now to FIG. 2; To allow for the option of desktop use and to allow for the fact that some users may at first be reluctant to commit to an unfamiliar typing position, an option is provided that allows the user to divide the central unit (1) housing and rotate the two halves of the central unit assembly about a hinge (5) located at the center point of the uppermost edge of the central unit assembly. This configuration allows the user to place the central unit on a flat surface and type on it in the familiar desktop position. In FIG. 2 the keyboard assemblies (6 and 7) of the central unit halves are shown in a concave arrangement. This geometry allows for greatest ergonomic advantage because the natural and comfortable range of the user's fingers is accommodated by the position of the keys rather than requiring the motion of the user's fingers to accommodate the position of otherwise planar keys. The wider electronic key switches (8) are provided for spacebar and other desired auxiliary purposes when the unit is used in desktop configuration and would not normally be used while the unit is suspended from the user's neck. The central unit (1) can also connect to and control other digital devices such as desktop computers, laptop computers, tablet computers or smartphones through cable or wireless communication. In the case of the larger computing devices, it is desirable to have a more ergonomic keyboard that may be used in a reclining position to ease neck strain as well as repetitive stress injuries to the hands. In the case of smartphones and tablet computers, the functionality of a tactile keyboard adds convenience when the user needs to enter more data than can be comfortably entered on touch screens or thumb keys. Openings (9) are shown in the end of the housing of each half of the central unit, furthest from the user's eyes, to allow for one or two cameras, depending on whether one or both are required for a given application, such as surveying or 3D photography.

Figure 3:
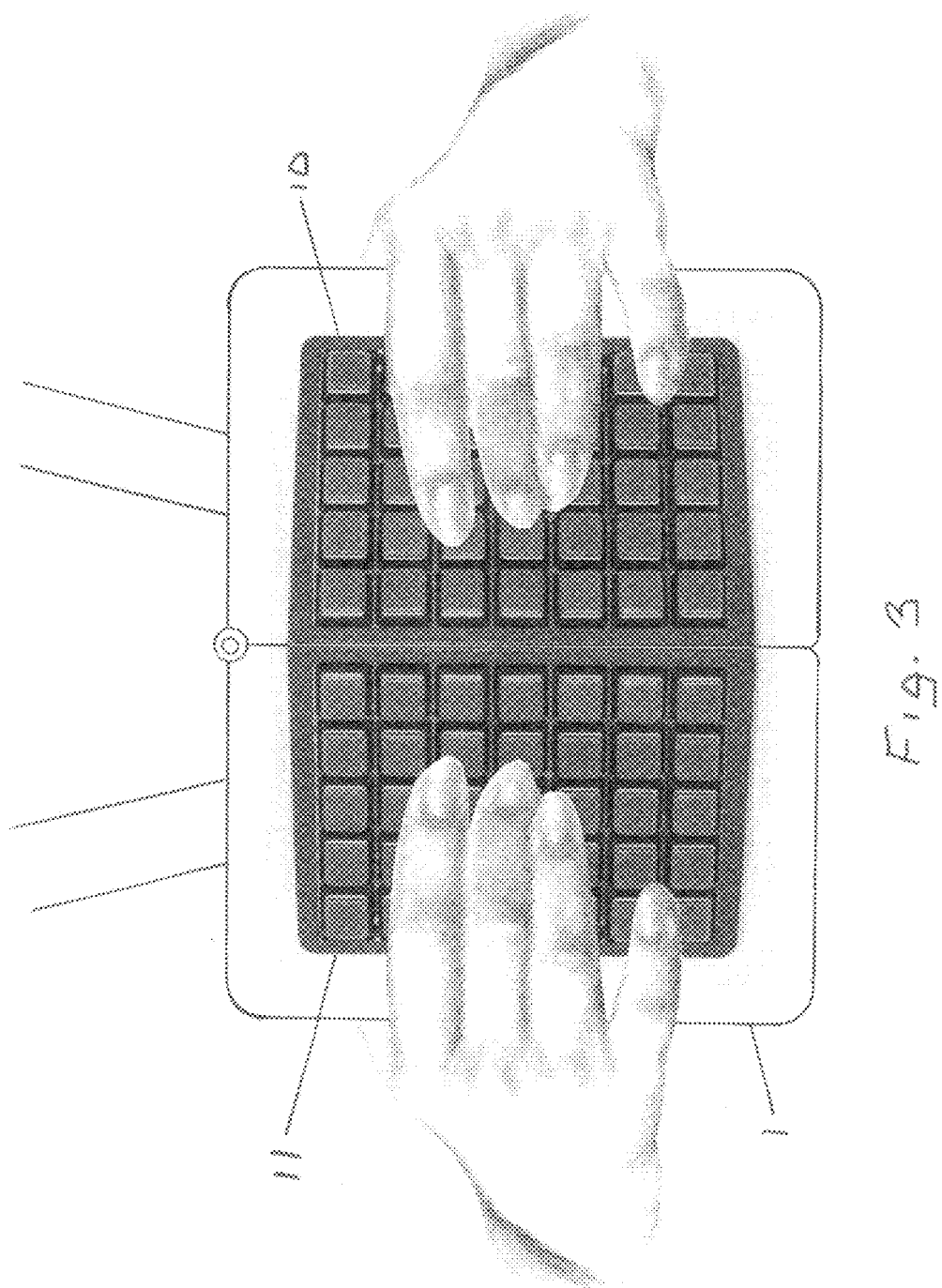
FIG. 3 shows the central unit with substantially flat key banks, having thirty five keys each. This flat configuration is useful to provide for the option of significantly more than twenty eight keys or to reduce the price of an otherwise costly dual-concave keyboard. This figure also shows the central hinge that allows for optional desktop use.

FIG. 3 depicts the central unit with flat keyboard assemblies (10 and 11) to allow for more keys than could be accommodated by concave keyboard assemblies (6 and 7). A central unit of this flat configuration can either be hinged open for use on a desktop or left closed (or even produced without a hinge for cost savings) and reprogrammed, via the keyboard menu, to reorient the keyboard pattern for use in a 'desktop orientation' that is 90 degrees removed from the original. The ability to reprogram the keyboard rather than hinge it open for desktop use allows for the elimination of the hinge and concave keyboards to offer some lower cost products as well as increase the number of keys available for those users who prefer such a tradeoff. The strictly ergonomic, concave key layouts will not accommodate alternate directional use because the key shapes and positions on these assemblies will be very closely associated with very specific hand and finger positions and motions.

Referring now to FIG. 4; A top view of the central unit is shown in the configuration that is available for desktop use, with the neck strap removed. A hinge (12) with two pivot points, allows for flush hinge construction in both suspended and desktop positions. The cursor controls, on the thumb control panels (13) that are usually located on the posterior surface of the central unit (1) are moved from the posterior surface to a position on the desktop by extension of a cable, sliding or preferably folded out by means of a hinge (14) in order to lie flat upon the surface of the desktop. This allows for access to those controls during desktop use, but does not necessarily require these controls to be used for the same function as they are used in their original position. An alternate programming of these controls allows the user to make these controls as convenient as necessary for a given application and hand position. For instance, a mouse button or trackball would no longer be used by the thumb in the desktop configuration and the orientation of the X and Y axes would have to be shifted in order to agree with the graphical travel direction of the cursor and other controlled elements on the display screen.

Referring now to FIG. 5; Accessory bays (15) are provided to allow for the addition of sensor and controller assemblies that might be needed for specialized applications in medicine, geology or other sciences. Various solid state and nanotech transducers can now supply useful information on environmental and physical attributes such as light, temperature, pressure, sound, attitude, location, direction, force, acceleration, chemistry, humidity, particulates, clarity, color, electrical voltage, and electrical current. Various transducers are also useful while the device is being used as a musical instrument, since tone control is often regulated by breath pressure, jaw pressure or through the use of foot pedals or positional changes. These accessory bays also accommodate any device that may be convenient to incorporate for human factors reasons, such as a smartphone that is being used in conjunction with the keyboard or the system as a whole.

Figure 6:
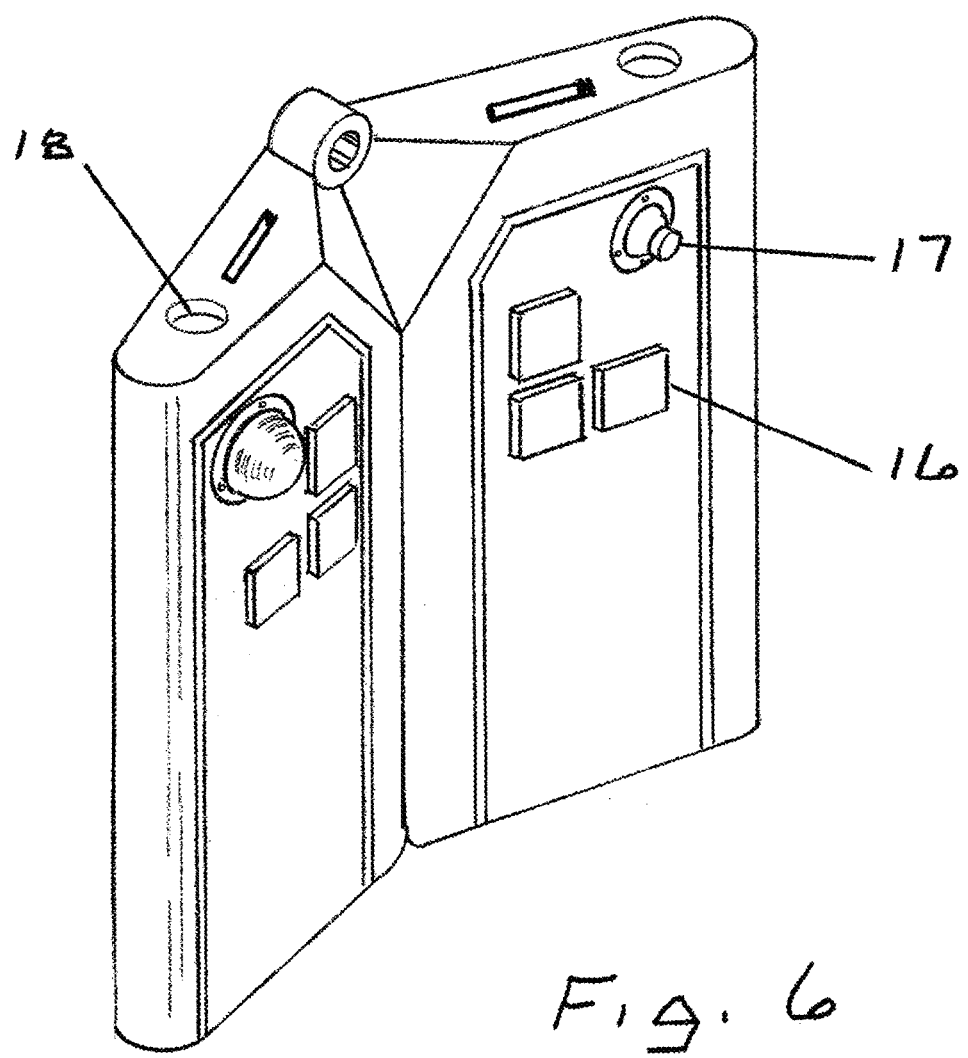
FIG. 6 shows one embodiment of the central unit (with the neck strap removed) from its posterior side, with thumb control banks that could be selected for the control of a cursor during the entering of text as well as for game control. Also visible are the edges of access ports that allow for simple service, the addition of hardware for additional applications, and the hinging out of the thumb controls for use in the desktop configuration.

Referring now to FIG. 6, the posterior surface of the central unit contains fewer electronic key switches (16) and various other control means (17) such as mouse pads, joy sticks, track balls, thumb wheels and touch screens, that are operated by the user's thumbs. In the most standard configuration this provides for user assignable keys and controls adequate to be used as space keys, shift keys and cursor control. In alternate application configurations there are options for control apparatus such as compound joysticks for game control and specialized keys and mouth controllers for use when configured as a musical instrument. Removable and replaceable modules may be placed in the accessory bays (15) beneath the thumb control panels to accommodate these options as well as after-market applications that may subsequently become available to work with this platform. One or more viewfinder type micro-displays (18) are provided within the housing to use in camera applications or as a handy, temporary display if no other display is attached or worn at that moment. If a smartphone or tablet computer is being used, the display of that device may also be temporarily adequate or even convenient if that device is more easily controlled at that moment through the use of its touch screen. Dual micro-displays are optionally provided to accommodate applications that would benefit from the availability of 3D display capability such as surveying, range finding, games and augmented reality applications if the presently attached near eye display is monocular. While a display is available within the housing for momentary deployment, the head mounted display is the preferred and more ergonomically proper display means for extended use. The configuration of the head mounted display may be tailored to the user's applications, in that a single, transparent display will be most useful when working with other people or while referring to hard copy documents, but a full coverage, stereoscopic, head mounted display will be more convenient while viewing 3D content, such as animations or engineering solid models.

Figure 7:
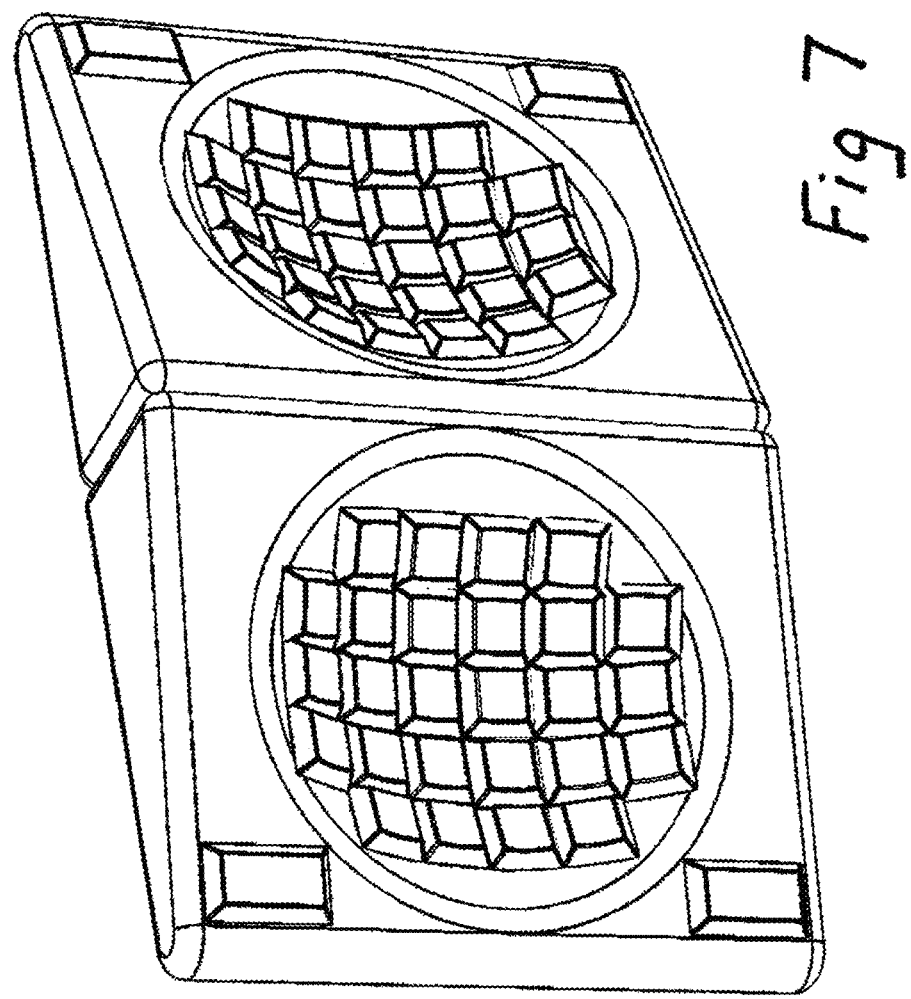
FIG. 7 shows one embodiment of the central unit as it would be positioned for use while suspended from the user's neck, in which the keyboard assemblies are concave to accommodate the ergonomics of the user's fingers range of motion most efficiently.

FIG. 7 shows one embodiment of the central unit as it would be positioned for use while suspended from the user's neck, in which the keyboard assemblies are concave to accommodate the ergonomics of the user's fingers range of motion most efficiently.

Figure 8:
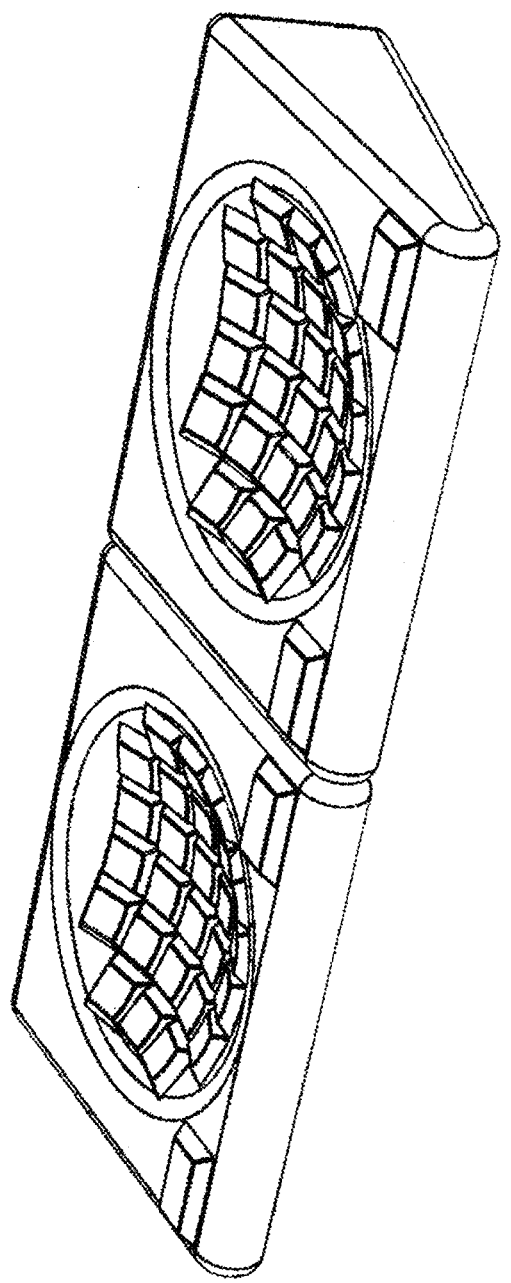
FIG. 8 shows the same embodiment of the central unit with concave keyboard assemblies as it would be positioned for use while deployed on a flat surface. The thumb control panels are not depicted in this view.

FIG. 8 shows the same embodiment of the central unit with concave keyboard assemblies as it would be positioned for use while deployed on a flat surface. The thumb control panels are not depicted in this view.

The larger apparent display area of a head mounted display allows for keyboard menus as depicted in FIG. 9. Although a QWERTY keyboard arrangement is depicted in FIG. 9, any keyboard arrangement may be viewed in this manner, as well as multiple layered windows of alternate symbols that the user chooses to have available for various applications. FIG. 9 shows an example of the graphical display that could be available for viewing in any convenient portion or portions of the display window of the user's head mounted display (3) (such as the upper corners) to assist the user in locating any given key while learning to use the system or while switching between different applications, alphabets or character sets. To provide a familiar example, the figure shows the standard QWERTY layout that would appear for an English text keyboard. This would change to match whatever layout the user had selected in order to prompt the user for the chosen application, alternate layout, game control or musical instrument. The 'home row' is seen split in a manner that causes the left hand finger positions for the letters A,S,D and F to be seen ascending vertically, as they would be viewed from the posterior of the suspended keyboard, so that the user has an intuitive visualization of the finger positions. Likewise, the right hand finger positions for the letters J,K,L and the semicolon can be seen descending vertically, also as they would be viewed from the posterior of the keyboard. This accommodates the prompting of unseen keys and less familiar character sets as well as the user's learning of various applications such as computer aided design or musical instrument performance. The large apparent display area of the head mounted display provides ample graphical space to accommodate alternate keyboard menus without interfering with the productive graphical work area. While the QWERTY keyboard is shown as an example, this is but one possible typing layout. Far better arrangements of keys now exist for text entry and others will likely be discovered that are more productive, especially on devices such as this, which deploy the thumbs more efficiently, but tend to restrict finger movement more than the standard desktop keyboard configurations. Since keyboards can now be programmable, various layouts can be stored in the device or on internet websites to allow users to invent and share those layouts as their applications and preferences dictate.

Figure 10:
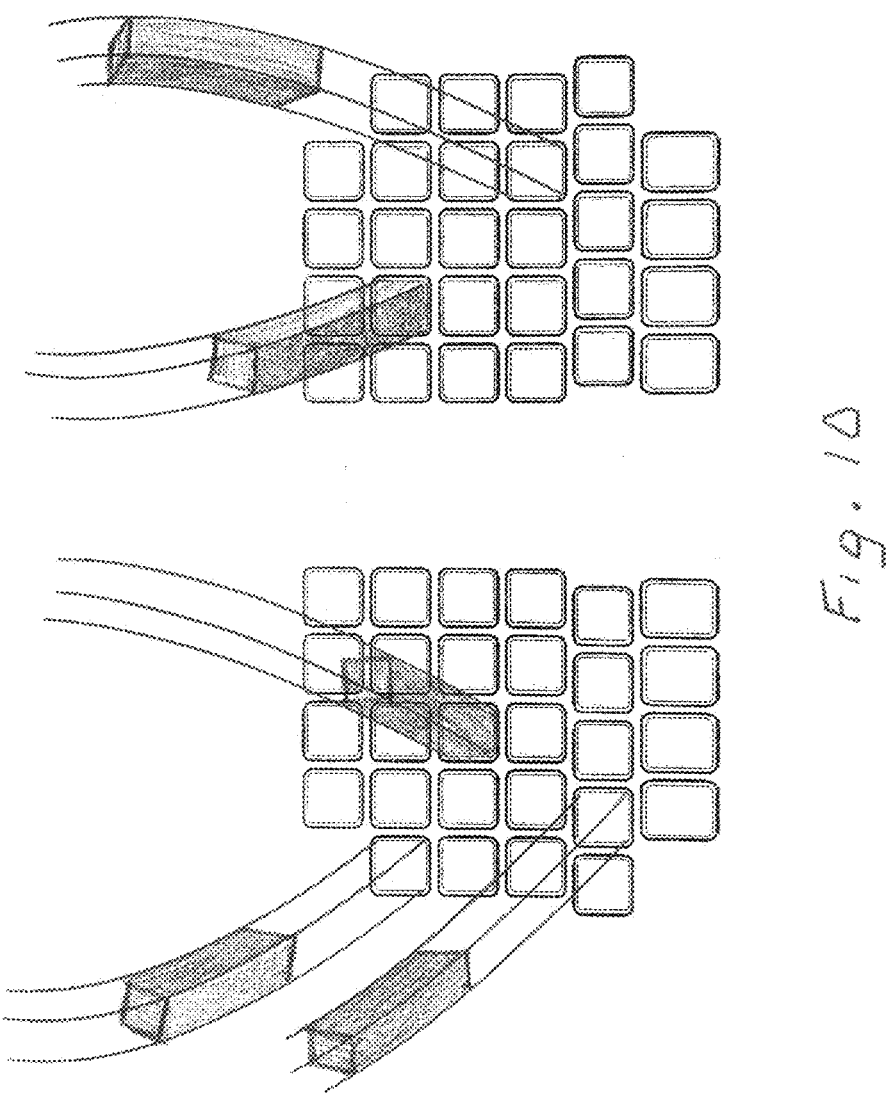
FIG. 10 shows an example of the display that would be available in the user's head mounted display to assist the user while doing musical exercises or learning a given piece of music while the system is being used as a musical instrument.

FIG. 10 shows an example of the display that would be available in the user's head mounted display to assist the user while doing musical exercises or learning a given piece of music while the system is being used as a musical instrument. Three dimensional bars of light descend onto the graphical depiction of keys that are to be played in the near future to prompt the user to anticipate and play each succeeding note or group of notes at the proper time and for the proper duration, depending upon how long it takes for each bar of light to disappear into the graphical depiction of the key.

Figure 11:
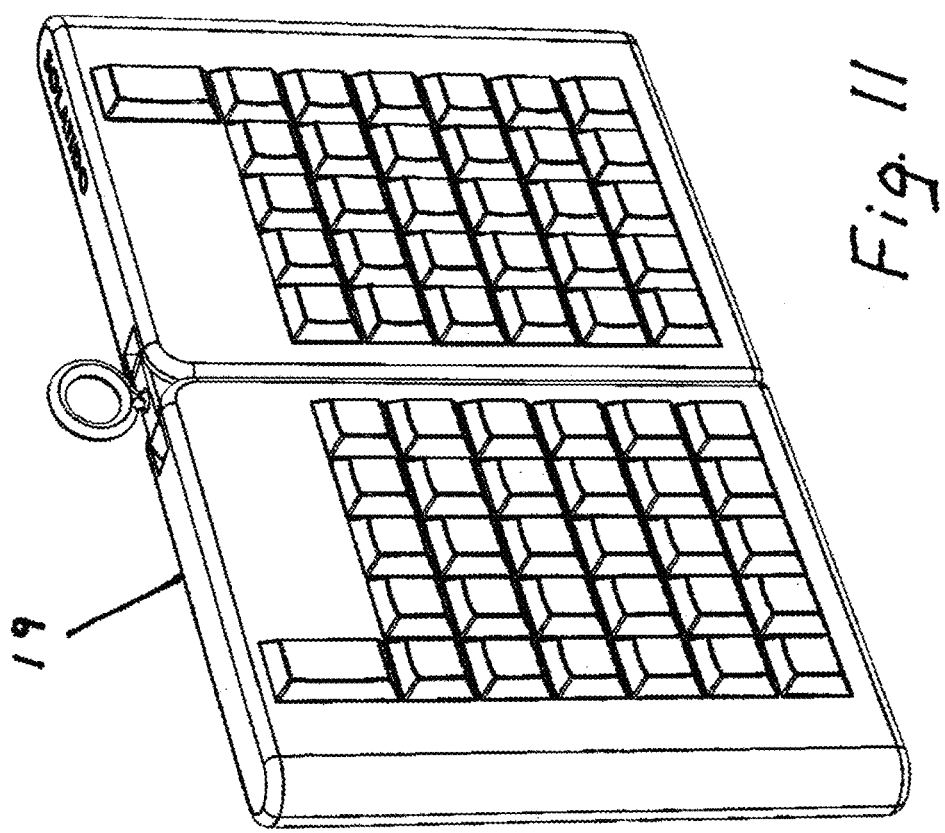
FIG. 11 shows a perspective view of the anterior surface of the central unit in the suspended configuration.

FIG. 11 shows a perspective view of the anterior surface of the central unit in the suspended configuration. The electronic key switches are relatively planar in this view and may be a more familiar contour to some users who have typed on flat keyboards for so long that getting used to a concave keyboard may be too much of a change. The attachment point for a neck strap is shown as an eye that is attached to the center of the double pivot hinge at the center of the uppermost edge (19) of the central unit.

Figure 12:
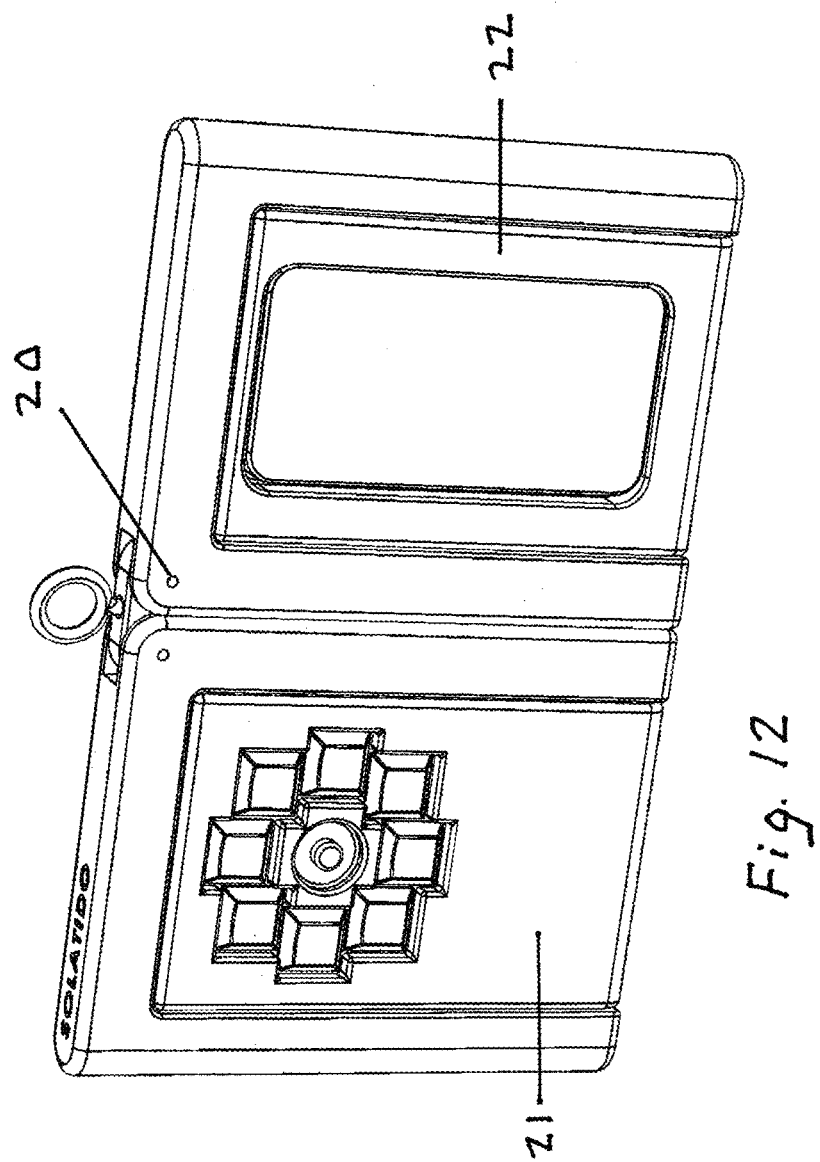
FIG. 12 shows a perspective view of the posterior surface of the central unit in the suspended configuration.

FIG. 12 shows a perspective view of the posterior surface of the central unit in the suspended configuration. The two pivot points (20) of the double pivot hinge are visible. Also shown, are thumb control panels including a plurality of electronic key switches and a joy stick on the left thumb control panel (21), and a pocket for a smartphone on the right thumb control panel (22).

Figure 13:
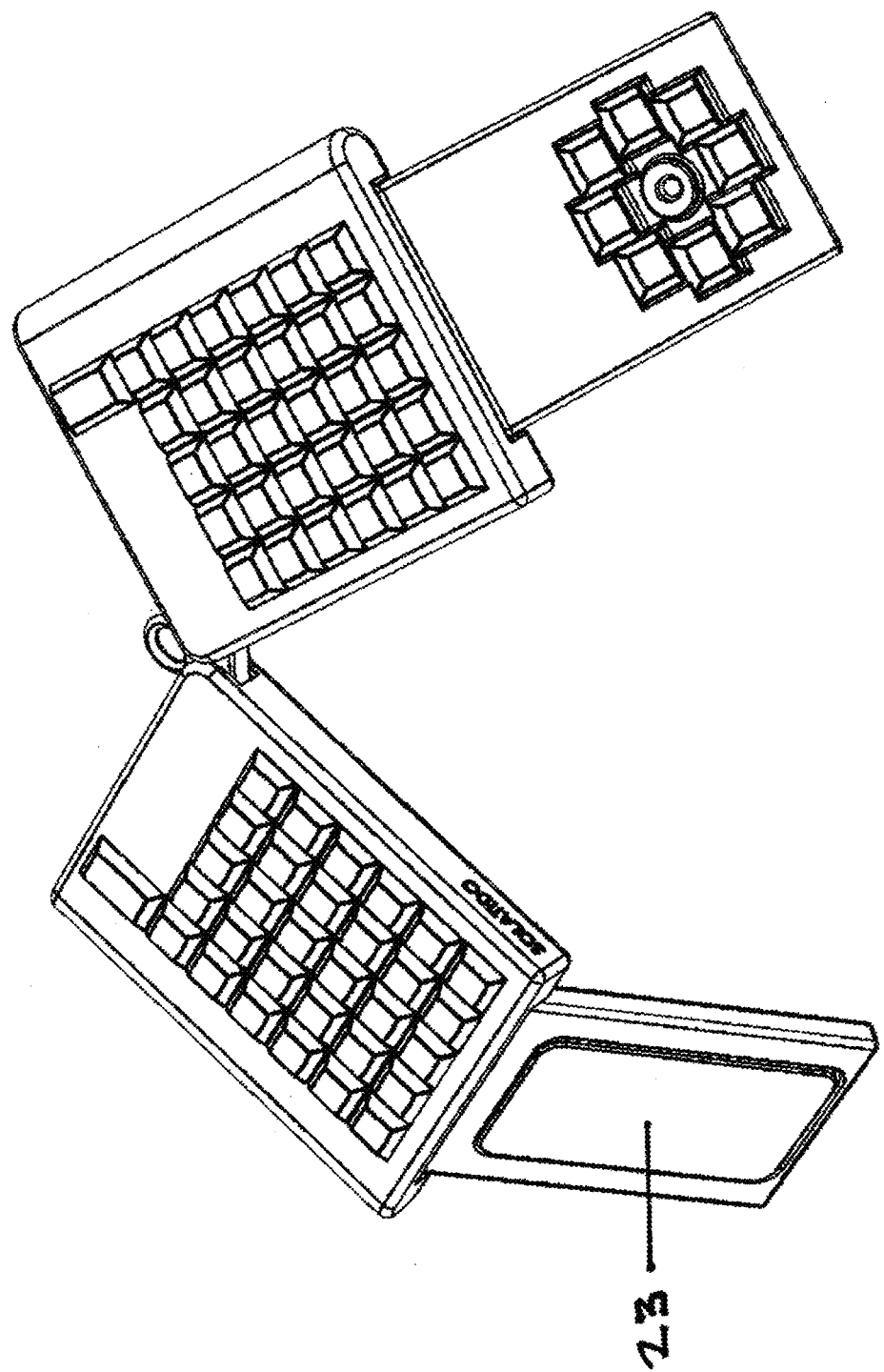
FIG. 13 shows a perspective view of the central unit in transition between the suspended configuration and the desktop configuration, with the central hinge and the thumb control panels partly open.

FIG. 13 shows a perspective view of the central unit in transition between the suspended configuration and the desktop configuration, with the central hinge and the thumb control panels partly open. A smartphone (23) is installed in the right thumb control panel (22).

Figure 14:
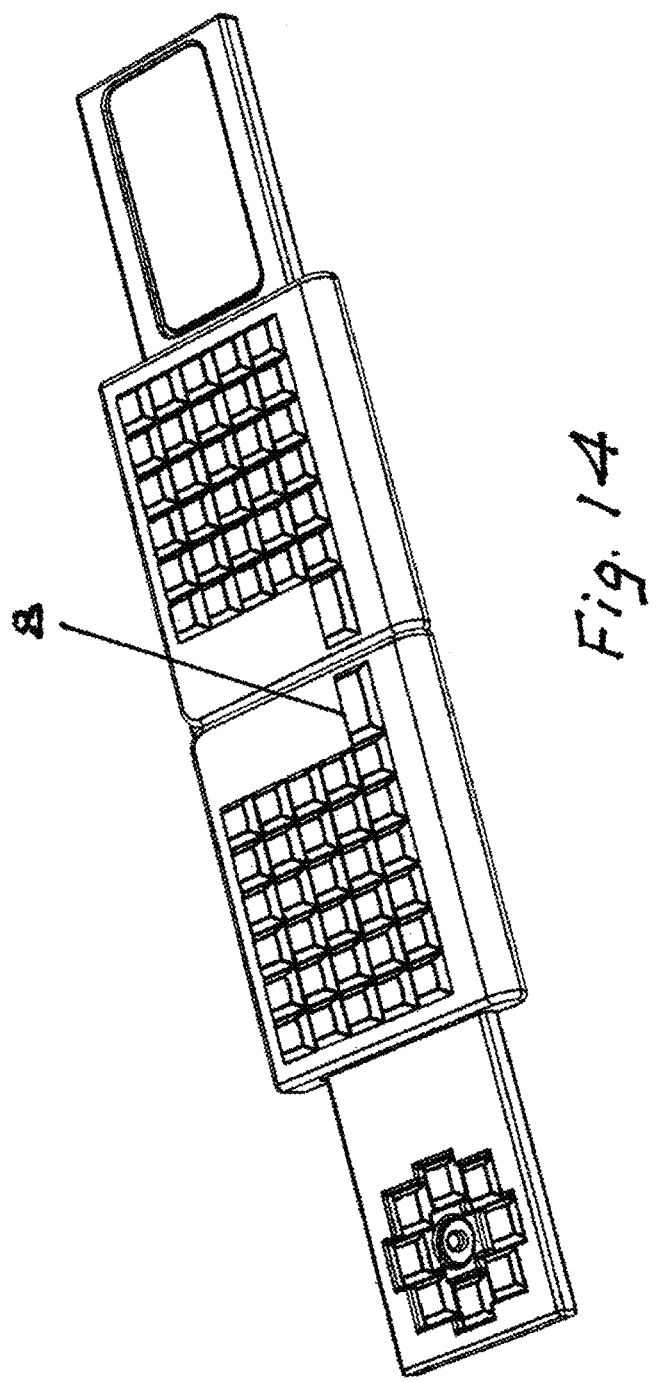
FIG. 14 shows a perspective view of the central unit opened up, with the thumb control panels hinged out to the sides.

FIG. 14 shows a perspective view of the central unit opened up into the desktop configuration, for use on a flat surface, with the thumb control panels hinged out to the sides to allow the user access to the thumb control panels. The wider electronic key switches (8), shown near the center of the assembly, are now accessible by the user's thumbs for use as space keys as they would normally be on any other desktop keyboard.

This apparatus allows for the flexible configuration of a wearable, mobile computing and communication device that is capable of a wide range of applications, particularly those that require the mobile sensing, creation, and manipulation of substantial content, including, but not limited to;

1. An inventory taking device whereby RFID, UPC, or QR codes are read in conjunction with computer vision pattern recognition of bulk packaging configurations and labels art, in order to allow for the calculation of a total number of units without physically counting each item.

2. A musical instrument in which the keys are assigned the musical notes of various existing musical instruments, such as concertina or saxophone, and additional mouth, breath and other controllers are used to control pitch bend, volume, and tone. New instrument configurations may also be devised by the user that bear no relationship to existing instruments, since the physical control of an electronic musical instrument does not need to follow any geometric relationship to the physics of vibrating physical materials. Instruction on any given musical instrument configuration is accomplished through the use of graphical animation. Streams of three dimensional, animated notes descend predictably onto the display's depiction of the key locations, from various directions, allowing the student/player to anticipate the timing, location and fingering of the next note, or combination of notes, well in advance of the time they are to be played. Tone and durational data is communicated by varying the attributes of the graphical depiction of each note. For example, each note can be portrayed by a three dimensional bar of light who's length depicts its duration, its width or diameter depicts its volume, and its color, clarity and reflectivity depict properties of its tone.

3. A mobile medical office that allows for the early detection, isolation and treatment of diseases in rural areas. Low cost sensors and readers can be deployed more rapidly and cost effectively if the computing portion of the device is standardized and wearable, but still allows for specific auxiliary sensors and the entering of a significant amount of patient information and time, situation, and location data.

4. An inspection, reporting and documentation tool for use by any mobile personnel including; (a) Police inspecting and documenting crime scenes and accident scenes, (b) Safety inspectors at food service venues, production plants or any other site that routinely must be inspected or reported on by government, safety, insurance or healthcare workers, (c) Service and maintenance workers who otherwise cannot conveniently carry a laptop computer or dedicated augmented reality device to the site of required service or maintenance, (d) Emergency responders during operations that require the continuous mobility of the worker, or constant updates and visualization through an augmented reality device.

5. A general purpose, full function computer that can replace an otherwise inconvenient laptop in instances where (a) A news reporter must observe, research, write or edit an article while standing at or walking through the scene of an event, (b) A parent must work while waiting in the car for a child to get out of school or an appointment, (c) A student must write homework while riding on or waiting for a bus, or in locations that do not allow for laptop use or the power requirements of laptop displays, (d) A Biologist must study and catalogue data concerning specimens encountered while walking through wilderness areas, (e) An office worker must write or design on a computer but needs a more ergonomically correct position in order to avoid hand and neck strain.

6. An augmented reality gaming system that displays 2D or 3D visual content in a head mounted display as an overlay to the actual surroundings that the user can view through a transparent display window or by virtue of a camera and processor that superimpose the content over the camera's image, as aligned by processing GPS, image, compass, and inertial data, allowing the gamer to interact with game content that seems to exist in the user's real surroundings.

The embodiments stated here give examples of uses and configurations. They are offered for explanatory purposes and should not be taken as language that limits the claimed invention.

The invention claimed is:

1. A computing device comprising:
 a user input device, the user input device comprising:
  an anterior surface on which is mounted a first set of keys and controls;
  a posterior surface on which is mounted a second set of keys and controls, wherein keys and controls of the first and second sets of keys and controls are programmably modifiable by a user;
  a suspender for suspending the input device in front of the user's torso;
 the computing device further comprising:
  a processing unit communicatively coupled to the user input device to receive user input, wherein said user input device and said processing unit together comprise a central unit;
 and
 a head-mountable display;
 and
  a memory having stored therein instructions executable by the processor to implement on said display a graphical user interface that includes a view of functional assignments of the keys and controls of the input device, the view including a posterior view of the first set of keys and controls.

2. The computing device of claim 1, wherein the anterior surface comprises a plurality of electronic key switches that face away from the user's torso and are oriented approximately in bilateral symmetry and are accessible and operable from the leftmost side of said central unit by the fingers of the user's left hand and are accessible and operable from the rightmost side of the central unit by the fingers of the user's right hand; and
 wherein the posterior surface comprises a plurality of electronic controls that face toward the user's torso and are accessible and operable by the user's thumbs.

3. The computing device of claim 1, wherein said suspender is selected from a group comprising neck straps, hook and loop fasteners, shoulder harnesses, and vests.

4. The computing device of claim 1, wherein at least one of said electronic controls on the posterior surface of said user interface is selected from a group comprising electronic key switches, mouse pads, joy sticks, track balls, thumb wheels and touch screens.

5. The computing device of claim 1, wherein said central unit comprises two physically separate halves that are pivotably attached to each other near the corners that form the center point of the uppermost edge of the central unit.

6. The computing device of claim 5, wherein the two halves of said central unit are pivotably attached to each other using a hinge with two pivot points.

7. The computing device of claim 6, wherein axes of the two pivot points are normal to the anterior surfaces of said central unit and constrain the movement of said two halves of said central unit to planar motion.

8. The computing device of claim 6, wherein at least a portion of said posterior surface of at least one of the halves of said central unit is pivotably attached near the lowermost edge of the at least one of the halves of said central unit by a hinge.

9. The computing device of claim 1, wherein said processing unit comprises a mobile device.

10. The computing device of claim 9, wherein the mobile device is removeably mounted on the posterior surface of said central unit.

11. The computing device of claim 9, wherein the mobile device comprises a smart phone.

12. The computing device of claim 9, wherein the mobile device can be used remotely from the central keyboard unit as a monitoring device.

13. The computing device of claim 5, wherein said central unit is reconfigurable to resemble a typical desktop keyboard on a horizontal surface by pivoting said two halves of said central unit into a position that causes their uppermost edges to touch and aligns their rightmost and leftmost edges along a common line to form a familiar desktop keyboard configuration.

14. The computing device of claim 13, wherein the controls on the posterior surfaces of either or both halves of said central unit are accessible in said desktop keyboard configuration by pivoting the posterior surface of either or both of the two halves of said central unit into a position that causes the controls to face up from the desk surface at the outer sides of said desktop keyboard configuration.

15. The computing device of claim 1, wherein the key switches and controls are reprogrammable to any function, group of functions, notes, tones, colors, movements, actions, letters, symbols, or macros.

16. The computing device of claim 1, wherein the key switches and the controls function as a musical instrument when assigned particular notes and effects.

17. The computing device of claim 1, wherein data from sensors other than key switches and controls is used to affect input to programs executing on said processing unit.

18. The computing device of claim 17, wherein said sensors other than key switches and controls are sensors that detect attributes comprising light, temperature, pressure, sound, attitude, location, direction, force, acceleration, chemistry, humidity, particulates, clarity, color, electrical voltage, and electrical current.

19. The computing device of claim 1, wherein a present functional assignment and any alternative assignments of said electronic key switches and said electronic controls are displayed in at least a portion of a visible graphical space in said head mounted display.

20. The computing device of claim 1, wherein said head mounted display is transparent such that the graphical content of augmented reality games and programs can be layered onto the ambient scenery in the user's view.

21. The computing device of claim 1, wherein said anterior surface further comprises two concave keyboard assemblies that are geometrically optimized to the pivotal reach of the user's fingers.

22. The computing device of claim 1, further comprising a graphical instruction system comprising:
a plurality of three dimensional animated bars of light that approach a graphical representation of the proper keys and controls to be activated next in time, each of said plurality of animated bars of light varying in length when necessary to communicate the duration of time that each key is to be depressed.

* * * * *